United States Patent
Gimeno et al.

(10) Patent No.: US 8,185,700 B2
(45) Date of Patent: May 22, 2012

(54) ENABLING SPECULATIVE STATE INFORMATION IN A CACHE COHERENCY PROTOCOL

(75) Inventors: Carlos Madriles Gimeno, Barcelona (ES); Carlos García Quinones, Barcelona (ES); Pedro Marcuello, Barcelona (ES); Jesús Sánchez, Barcelona (ES); Fernando Latorre, Huesca (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 12/226,793

(22) PCT Filed: May 30, 2006

(86) PCT No.: PCT/ES2006/070074
§ 371 (c)(1),
(2), (4) Date: Oct. 28, 2008

(87) PCT Pub. No.: WO2007/138124
PCT Pub. Date: Dec. 6, 2007

(65) Prior Publication Data
US 2009/0083488 A1    Mar. 26, 2009

(51) Int. Cl.
*G06F 12/00*    (2006.01)
(52) U.S. Cl. ........ 711/141; 711/150; 711/151; 711/152; 711/154; 711/163; 711/121; 711/120; 711/146; 711/123; 712/21; 712/216

(58) Field of Classification Search .............. 712/21, 712/216; 711/120, 121, 141, 146, 150, 151, 711/152, 154, 163, 213
See application file for complete search history.

(56) References Cited

U.S. PATENT DOCUMENTS

| | | | |
|---|---|---|---|
| 6,122,712 A | 9/2000 | Torii | 711/141 |
| 6,389,446 B1 | 5/2002 | Torii | 709/100 |
| 7,404,041 B2 * | 7/2008 | Gara et al. | 711/121 |
| 7,657,880 B2 * | 2/2010 | Wang et al. | 717/149 |
| 2003/0014602 A1 | 1/2003 | Shibayama et al. | 711/156 |
| 2004/0154010 A1 | 8/2004 | Marcuello et al. | 717/158 |
| 2008/0134196 A1 | 6/2008 | Madriles et al. | 718/106 |

FOREIGN PATENT DOCUMENTS
WO    WO 2004/075046    9/2004

OTHER PUBLICATIONS

State Intellectual Property Office, P.R. China, Second Office Action dated Jan. 19, 2011 in Chinese patent application No. 200680054734.1.

(Continued)

*Primary Examiner* — Midys Rojas
(74) *Attorney, Agent, or Firm* — Trop, Pruner & Hu, P.C.

(57) ABSTRACT

In one embodiment, the present invention includes a method for receiving a bus message in a first cache corresponding to a speculative access to a portion of a second cache by a second thread, and dynamically determining in the first cache if an inter-thread dependency exists between the second thread and a first thread associated with the first cache with respect to the portion. Other embodiments are described and claimed.

15 Claims, 10 Drawing Sheets

OTHER PUBLICATIONS

State Intellectual Property Office, P.R. China, First Office Action issued Jul. 9, 2010 in Chinese patent application No. 200680054734.1.

PCT/ES2006/070074 International Search Report with Written Opinion of the International Searching Authority Mailed Feb. 28, 2007 (in Spanish).

J. Gregory Steffan, et al., "A Scalable Approach to Thread-Level Speculation," 2000, pp. 1-12.

Lance Hammond, et al., "Data Speculation Support for a Chip Multiprocessor," 1998, pp. 1-12.

Sridhar Gopal, et al, "Speculative Versioning Cache," 1998, pp. 1-11.

Venkata Krishnan, et al., "Hardware and Software Support for Speculative Execution of Sequential Binaries on a Chip-Multiprocessor," 1998, pp. 1-8.

German Patent and Trademark Office, Office Action dated Sep. 8, 2009, in related German patent application No. 112006003917.2-53.

German Patent and Trademark Office, Office Action mailed Jun. 30, 2011 in German application No. 11 2006 003 917.2.

\* cited by examiner

ENABLING SPECULATIVE STATE INFORMATION IN A CACHE COHERENCY PROTOCOL

BACKGROUND

Embodiments of the present invention relate to processor-based systems, and more particularly to implementation of a memory coherency protocol within such a system.

In recent years, processors have incorporated increasing support for thread-level parallelism. Usually, the thread-level parallelism exploited by architectures is explicit or non-speculative. The use of speculative thread-level parallelism has been proposed to further increase the benefits of multi-threaded/multicore architectures. In such approaches, code is partitioned into pieces that are speculatively executed in parallel. Transactional memory execution is a similar technique where different threads are allowed to speculatively access and write to memory, ignoring possible inter-thread data dependencies. On these two execution models, the speculative memory state is atomically committed to the architectural state or discarded depending on run-time checks (e.g., inter-thread memory dependencies).

To efficiently implement these execution models on current multithreaded and multicore processors, hardware support in the memory subsystem is extended with support to manage speculative state, detect inter-thread data dependencies, and commit or squash the speculative state. In this way a memory subsystem may be able to keep a different speculative version per thread of the same memory location so that speculative threads of the same application can share the memory space and write to the same memory locations. A memory subsystem extended with speculation and multi-versioning support is called a multi-version cache (MVC). Often such systems include centralized tables such as a memory disambiguation table to maintain track of speculatively accessed data. However, such hardware support is expensive and consumes significant real estate and power. Such support typically further requires hardware-based read ordering support. Furthermore, significant communication between various caches of such systems is required, including transmission of the speculative data itself, which increases bus traffic and adversely affects performance and power consumption.

DETAILED DESCRIPTION

Figure 1:
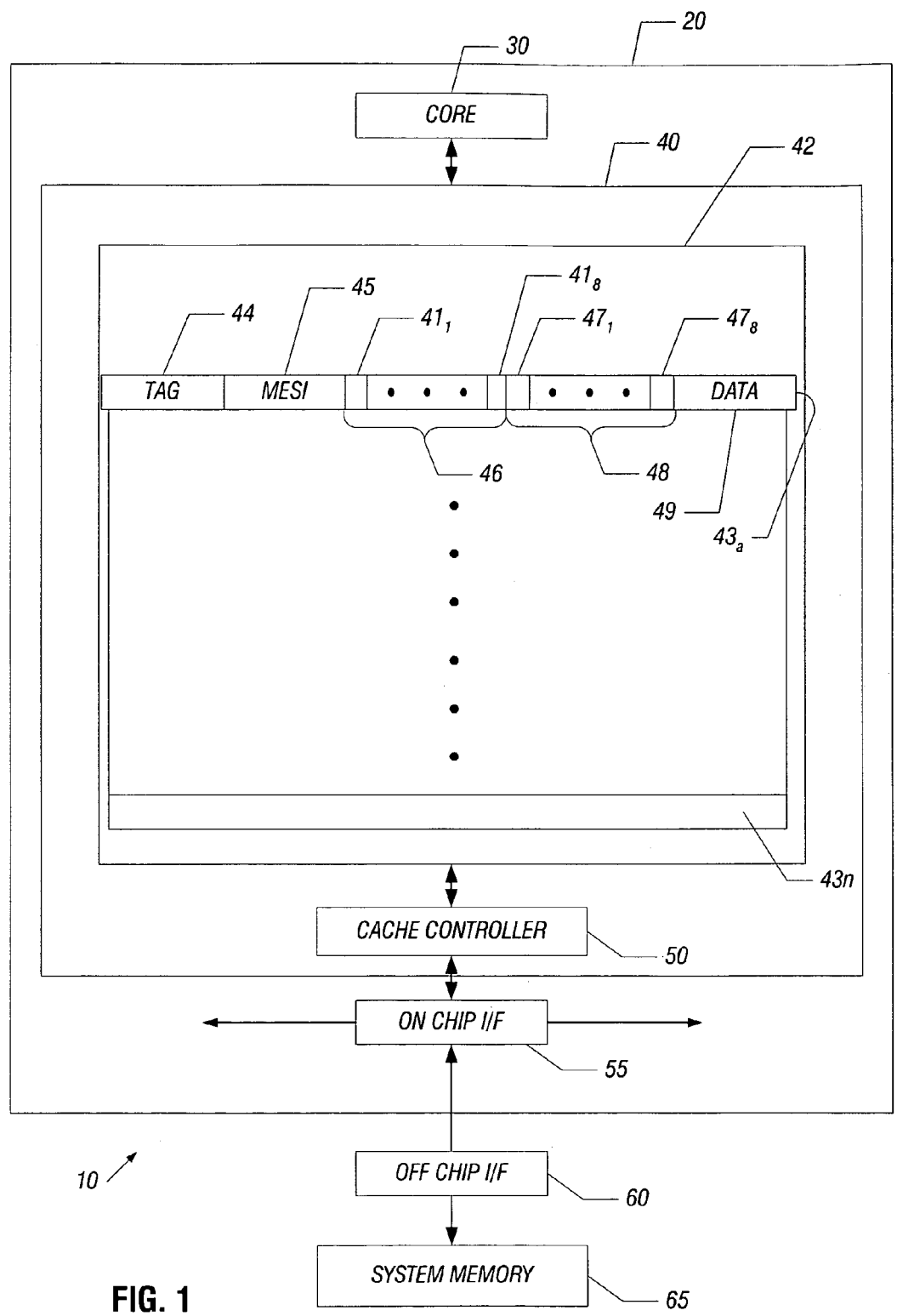
FIG. 1 is a block diagram of a portion of a system in accordance with one embodiment of the present invention.

In various embodiments, a multi-versioning cache protocol may be implemented in a system to enable speculative processing of multiple threads and/or transactions. In this way, improved performance can be realized as threads can execute in parallel and a cache coherence protocol, in combination with software that manages thread ordering, can determine validity of any given speculative thread.

Further, to reduce hardware complexity, a multi-version cache in accordance with an embodiment of the present invention does not implement communication of speculative memory values among speculative threads. By not performing such communication, hardware is significantly simplified, since it avoids a centralized version control logic. Accordingly, hardware to implement speculative thread execution may be minimized, and furthermore, there is no need for a centralized directory or other centralized cache structure. Instead, a cache controller associated with local caches may receive bus traffic regarding speculative accesses and, based on this information and the minimal speculative hardware state in the cache, determine if there is a conflict to an accessed location. If so, the cache controller may send a signal to a software layer, e.g., an application handler to determine the nature of the conflict. Upon the determination of one or more threads to be squashed, the application handler may send a bus message to cause the squashing. The cache controller(s) associated with the thread(s) to be squashed may set the state of one or more cache lines associated with the thread accordingly.

In various embodiments, a multi-version cache coherence protocol based on a conventional modified, shared, invalid (MSI)/modified, exclusive, shared, invalid (MESI) protocol may be implemented. The protocol, which may be referred to herein as a MU[E]SLI protocol, includes additional states (e.g., a L state corresponding to a speculatively loaded state, and U state corresponding to an unsafe state) and may operate at word granularity, dynamically detect inter-thread memory dependencies, and support one speculative version of a memory location per data cache. That is, the protocol may support one speculative version of a given word per thread and per data cache.

Speculative memory state may be maintained on each core's local data cache and is not propagated to upper levels of a memory hierarchy until it is committed. Eviction of a speculatively modified cache line may cause a squash of the speculative thread running on that core. Coherence activity due to non-speculative loads and stores may operate at line granularity. For speculative loads and stores, the protocol may operate at word granularity to support speculative versions and reduce unneeded squashes due to false sharing.

Inter-thread memory dependencies may be dynamically checked. When a data dependency is detected (e.g., read-after-write (RAW) or write-after-read (WAR) inter-thread dependence), a violation handler may be invoked. The violation handler may execute at application level and squash the speculation activity appropriately. To reduce hardware complexity, the protocol has no concept of thread order. In the case of speculative multithreading where there is a sequential order among threads, a software layer that manages the thread ordering may be implemented. For instance, in case of an inter-thread data dependence violation, the invoked software handler is responsible for checking whether it is a read-after-write dependence before squashing the speculative thread that has performed a read (and all its successors).

In various embodiments, evictions of non-speculative cache lines may be handled according to the MESI protocol. However, since the speculative memory state and information status is kept locally in the data cache and is not propagated to upper levels until it is committed, any eviction of a speculatively accessed (i.e., read or written) cache line causes a violation, similar to an inter-thread data dependency.

On the other hand, the protocol may allow for a mix of speculative and non-speculative load/stores on the same local data cache. Generally, any load/store performed by a speculative thread is treated as speculative. However, special loads/stores, termed "safe" accesses, can be performed by any thread (speculative or not) to access shared memory and these accesses may be treated as non-speculative. Thus, some interactions can happen when speculative and non-speculative loads/stores performed by the same thread access the same locations. In that case, the protocol may solve this issue by raising a violation whenever a non-speculative load/store accesses a speculatively accessed word location (i.e., with the U or L bit set).

In various embodiments, the coherence protocol may dynamically keep track of memory data words speculatively accessed and check for inter-thread data dependencies in order to detect mispeculations on-the-fly. The mechanism to dynamically check for inter-thread dependencies may be based on various bus messages. In one embodiment, such messages may be tagged with the thread identifier (ID) of the thread that generates the message, the address of the accessed cache line and at least one word mask to indicate the accessed word(s) within the line. These messages may take different forms in different embodiments. However, the messages may be used to indicate to other cache controllers the status of speculatively accessed data. In response, these cache controllers may take various actions as discussed further below. In one embodiment, bus messages that may be generated on speculative access may include a check read message, a check write message and a check non-speculative write message (respectively a ChkRd, ChkWr, and ChkNSWr message).

While embodiments may be implemented in different systems, in one embodiment a multi-versioning cache may be used in a multiple processor system. For example, the system may include multiple processors, e.g., cores of a multicore processor or multiple processors of a multiprocessor system. Each core may include or be associated with a local cache, e.g., a level 1 (L1) cache including a cache controller.

Referring now to FIG. 1, shown is a block diagram of a portion of a system in accordance with one embodiment of the present invention. As shown in FIG. 1, system 10 includes a processor 20 that is coupled to a system memory 65, which may be a dynamic random access memory (DRAM), in one embodiment. As shown in FIG. 1, processor 20 may be coupled to system memory 65 via an off-chip interface 60, although the scope of the present invention is not limited in this regard.

As further shown in FIG. 1, processor 20 includes a core 30 and a cache memory 40. In one embodiment, processor 20 may be a single core processor, however in other implementations processor 20 may be a multicore processor, in which other cores may be similarly configured with a core and associated cache memory. Cache memory 40, which may be an L1 cache, includes a memory array 42 and a cache controller 50. Memory array 42 includes a plurality of cache lines 43a-43n (generically cache line 43). Each cache line 43 may store multiple words of data in a data portion 49. While the scope of the present invention is not limited in this regard, in one embodiment data portion 49 may store 8 words. In addition to data storage, each cache line 43 may include an associated tag 44, which may be used to address the cache line. Furthermore, each cache line 43 may include a first state portion 45, which may in turn include a number of bits or indicators according to a selected cache coherence protocol. For example, in one embodiment this may be an MESI protocol. In other embodiments other cache protocols may be used such as a MSI protocol.

Still referring to FIG. 1, each cache line 43 may further include a first speculative mask 46, also refereed to as first word mask. First speculative mask 46 may include a bit associated with each word of data portion 49. Accordingly, in the embodiment of FIG. 1, first speculative mask 46 may include first speculative indicators $41_1$-$41_8$ (generically first speculative indicator 41) each associated with a corresponding word in data portion 49. First speculative word mask 46 may be used to indicate that a speculative read has occurred to the associated word in data portion 49.

Similarly a second speculative mask 48, also referred to as second word mask may include a bit associated with each word of data portion 49. As shown in FIG. 1, second speculative mask 48 may include second speculative indicators $47_1$-$47_8$ (generically second speculative indicator 47) each associated with a corresponding word in data portion 49. Second speculative word mask 48 may be used to indicate that a speculative write has occurred to the associated word in data portion 49.

In one embodiment, each second indicator 47 of second speculative word mask 48 may be referred to as a U bit (Unsafe), which is set when a store of a speculative thread or a transaction region writes in the corresponding word. Similarly, each first indicator 41 of first speculative word mask 46 may be referred to as an L bit (speculatively Loaded), which indicates that the data word has been read by the speculative thread or transaction and it was not produced by this thread/transaction. A speculative load may set this bit on any read word that has the U bit cleared.

Thus when speculative execution is occurring that accesses data in cache memory 40, cache controller 50 may cause the appropriate indicators in first speculative mask 46 and second speculative mask 48 to be set. Furthermore, based upon the state of a given cache line, cache controller 50 may cause the generation and transmission of bus messages to notify other system agents, e.g., other cache controllers, regarding the state of the various cache lines. In this way, speculative processing may be implemented using minimal added hardware. In various embodiments, cache controller 50 may further be configured to receive incoming bus messages, e.g., from other cache controllers and determine if a conflict exists between an address indicated by the bus message and a location in cache memory 40. If so, cache controller 50 may send a data dependency violation message, e.g., to core 30 to enable execution of an appropriate handler to determine ordering between conflicting accesses.

As further shown in FIG. 1, processor 20 may include an on-chip interface 55, which enables communication between various cores within processor 20, in embodiments in which processor 20 is a multicore processor. While shown with this particular implementation in the embodiment of FIG. 1, it is to be understood that the scope of the present invention is not limited in this regard.

Figure 2:
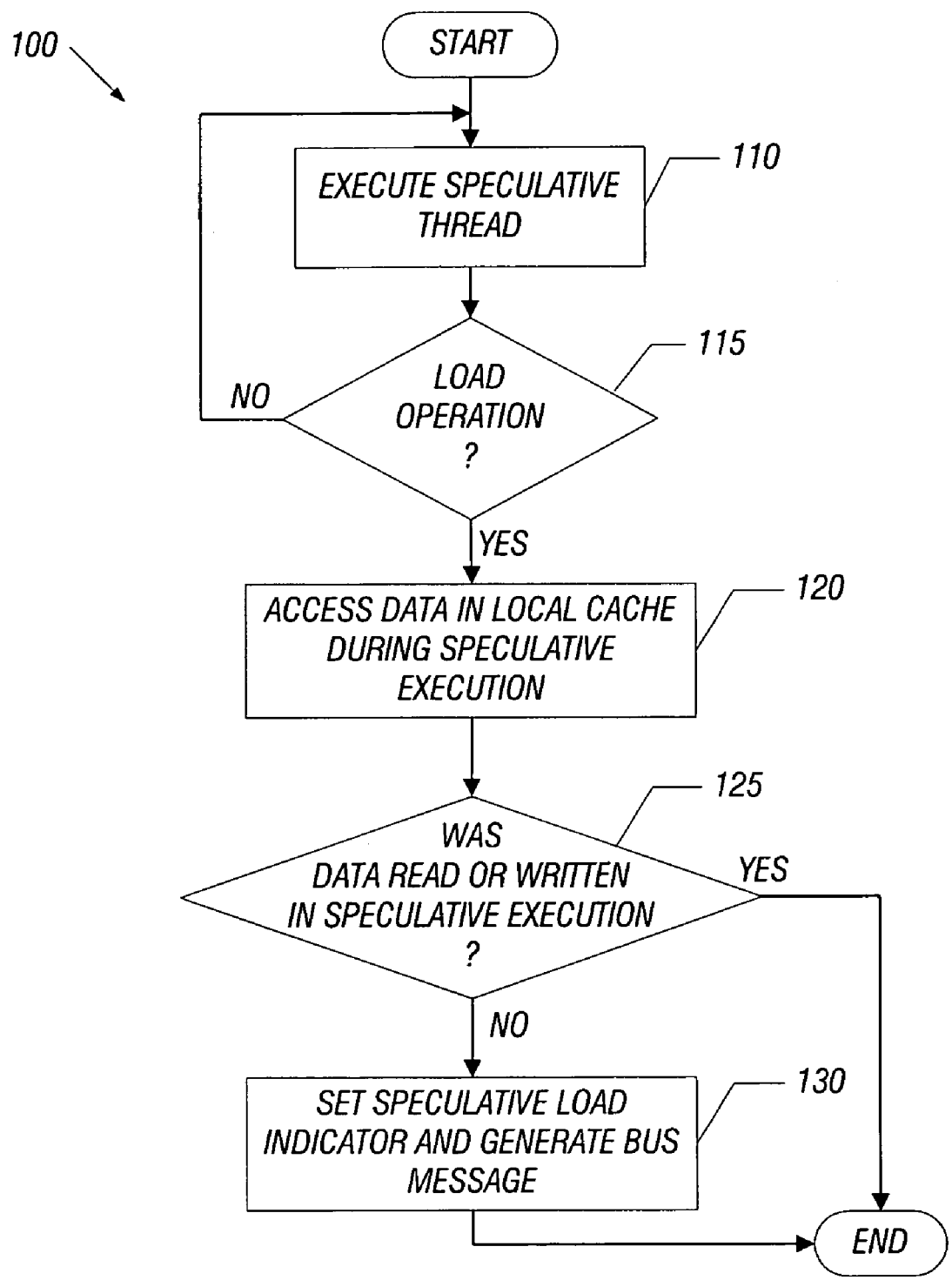
FIG. 2 is a flow diagram of a method for performing speculative execution in accordance with an embodiment of the present invention.

Referring now to FIG. 2, shown is a flow diagram of a method for performing speculative operations in accordance with an embodiment of the present invention. As shown in FIG. 2, method 100 may begin by speculatively executing a thread (block 110). Such speculative execution may correspond to a thread to be executed, e.g., based on branch-based prediction of a likely path of program flow. In other implementations, the speculative execution may correspond to execution of a transaction in a transactional memory system in accordance with an embodiment of the present invention. During execution of the speculative thread, it may be determined whether a load operation is to be performed (diamond 115). If not, control passes back to block 110, discussed above. If a load operation is to be performed, control passes to block 120. There, data may be accessed in a local cache (block 120). For example, a core executing the thread may request data that is present in an L1 cache. Next, it may be determined whether the accessed data was read or written during the current speculative execution (diamond 125). For example, a U bit and an L bit associated with the data may be checked to determine the speculative state of the data accessed. If it is determined that the data was not accessed during the speculative execution, control passes to block 130.

To enable multi-versioning of the accessed data, a cache controller associated with the L1 cache may set a speculative load indicator for the associated data provided to the processor and furthermore may generate a bus message (block 130). More specifically, the cache controller may send the requested data to the core. Furthermore, the cache controller may set one or more speculative load indicators associated with the data. For example, with reference back to FIG. 1, assume that the core requests data of an entire cache line 43. Given that assumption, cache controller would set all of first indicators $41_1$-$41_8$ of first speculative word mask 46 to indicate that all corresponding data of a cache line 43 has been loaded. Furthermore, to maintain coherency between multiple threads, the cache controller may further generate a bus message. Note that this bus message may only be generated the first time that a given data location is speculatively accessed during a speculative thread. In this way, reduced bus traffic is realized, while still providing the needed information, namely that the speculative thread has accessed a given memory location. In one embodiment, a check message to indicate that data in its cache has been speculatively loaded in one embodiment, may be sent, which may correspond to a check read bus message, i.e., ChkRd. This message may be sent with the address of the cache line and the contents of the first word mask. This message may cause other cache controllers to determine that no store has written to a word in this word mask. The analysis of the word mask by another cache controller will be discussed below. Note that block 130, and its operations of setting a load indicator and generating a bus message, are not performed if the data accessed was read or written and stored in the local cache during the current speculative execution. Accordingly, block 130 is bypassed and method 100 concludes.

Figure 3:
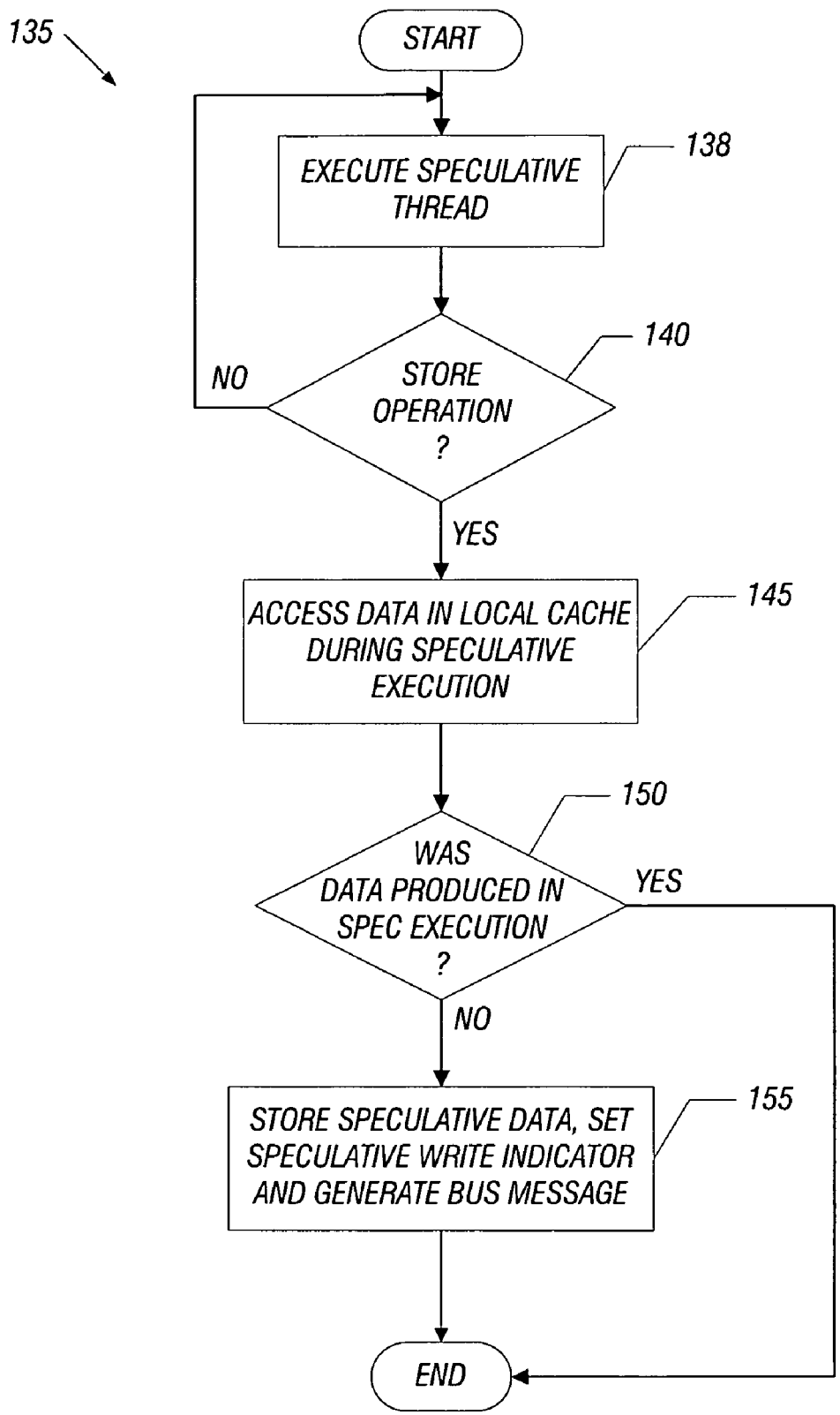
FIG. 3 is a flow diagram of a method for performing additional speculative operations in accordance with an embodiment of the present invention.

Referring now to FIG. 3, shown is a flow diagram of a method for performing further speculative operations in accordance with an embodiment of the present invention. As shown in FIG. 3, method 135 may begin by continuing speculative execution of a thread (block 138). Next, it may be determined whether a store operation is to be performed (diamond 140). If not, control may pass back to block 138 for further speculative execution. If instead a store operation is to be performed, control may pass to block 145.

There, data may be accessed in the local cache during speculative execution (block 145). Next, it may be determined whether the data was produced in the speculative execution (diamond 150). If so, method 135 may conclude. If not, control passes from diamond 150 to block 155.

There, the speculative data may be stored, and a speculative write indicator may be set. Furthermore, a bus message may be generated (block 155). That is, in addition to storing the data in data portion 49 of a cache line 43, one or more second indicators 47 may be set within second speculative mask 48 to indicate this writing of speculative data. Furthermore, the associated cache controller may send a bus message, e.g., a check write message, i.e., ChkWr, that may be received by other cache controllers which then check that no load has read data from a word in the second speculative mask 48 corresponding to a written-to location. As with the check read message described above, this check write message may only be sent the first time that a data location is provided with store data during execution of a speculative thread. This reduces bus traffic while still providing the needed information, namely that a given data location has been modified during speculative execution. Note that while described with this particular implementation in the embodiment of FIG. 3, is to be understood that the scope the present invention is not so limited. Furthermore, note that additional actions may be undertaken in a system to confirm whether the speculative execution was proper and should be committed or whether the speculative execution should be squashed, as will be described further below.

Figure 4:
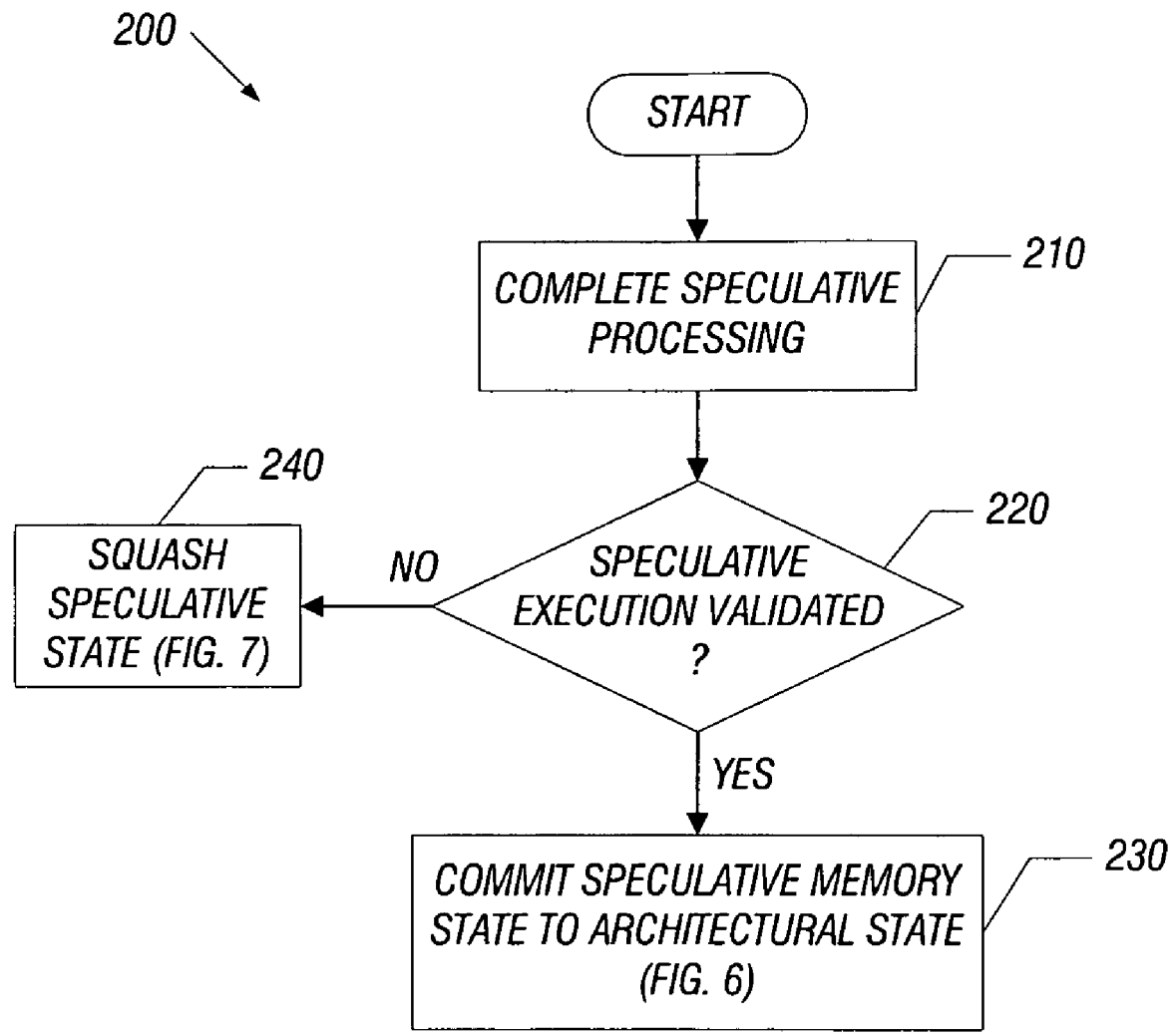
FIG. 4 is a flow diagram of a method for further speculative operations in accordance with an embodiment of the present invention.

Referring now to FIG. 4, shown is a flow diagram of a method for still further speculative operations in accordance with an embodiment of the present invention. As shown in FIG. 4, method 200 may begin by completing speculative processing (block 210). For example, such speculative processing may be completed when a speculative thread reaches the end of its instruction stream or when a transaction in a transactional memory system completes its operation. In either event, the speculative execution may write data speculatively determined into a local cache, e.g., an L1 cache of a core on which the speculative execution occurred.

Then it may be determined whether the speculative execution is validated (diamond 220). This determination may take into account whether the data used by the core for speculative execution was valid. In different embodiments, the validation may occur in different manners and may be performed by various software in combination with hardware.

Still referring to FIG. 4, if the speculative execution is validated, control passes to block 230, where the speculative memory state may be committed to the architectural state (block 230). Such committing of the local cache state may be performed in accordance with a flow diagram discussed below with regard to FIG. 6. Alternately, if the execution is not validated, control passes to block 240. There, the speculative state may be squashed. In one embodiment, such squashing may be performed in accordance with the flow diagram of FIG. 7, discussed further below.

As described above, in addition to setting indicators and generating bus messages during speculative execution, a cache controller may also receive bus messages, e.g., from other cache controllers associated with speculative execution. These bus messages may include information regarding the speculative state of data in cache lines associated with the cache controller sending such messages. Based on these messages, a receiving cache controller may determine whether a hit occurs to a location in its local cache.

Figure 5:
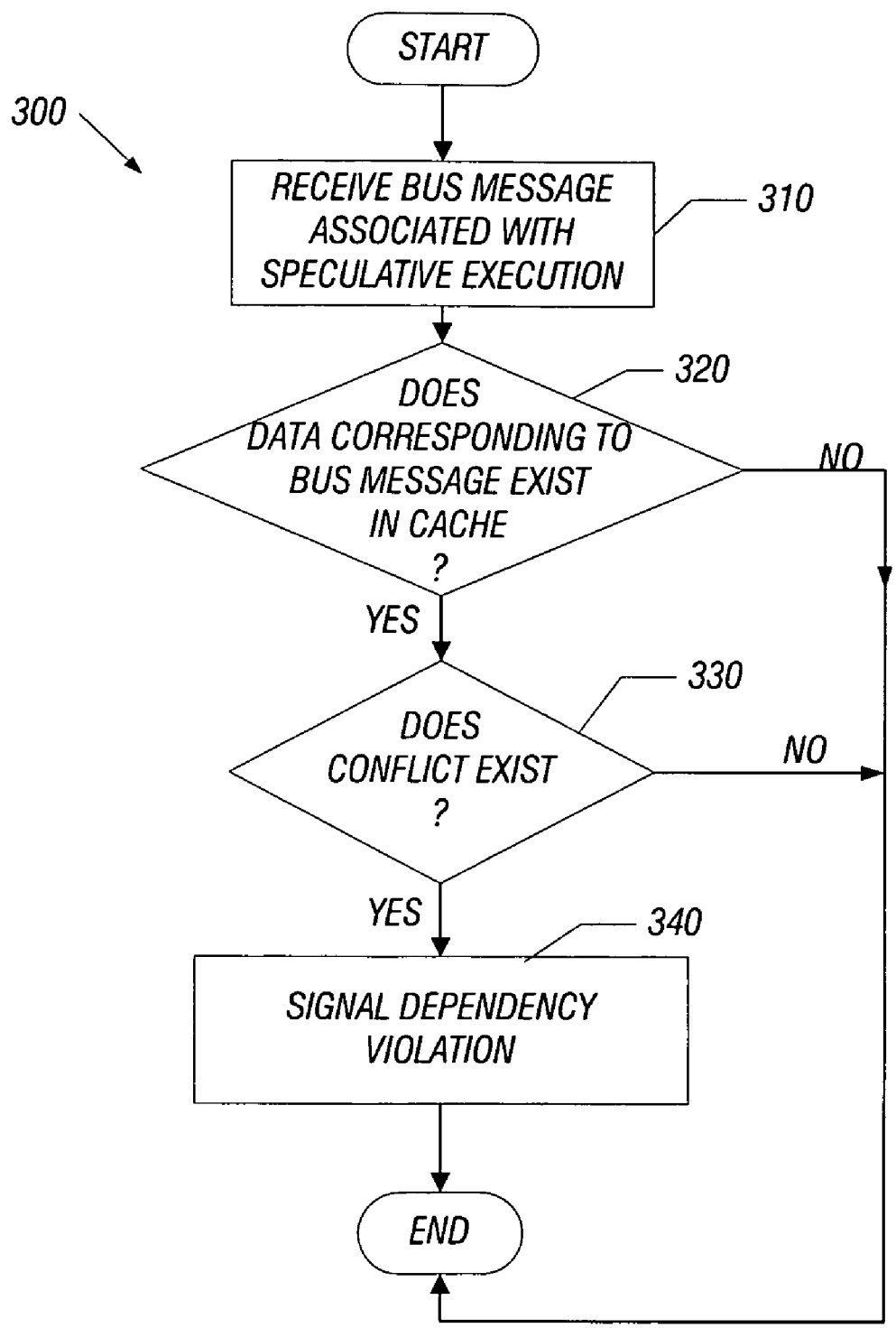
FIG. 5 is a flow diagram of a method for processing received bus messages in accordance with an embodiment of the present invention.

Referring now to FIG. 5, shown is a flow diagram of a method for processing bus messages received in accordance with an embodiment of the present invention. As shown in FIG. 5, method 300 may begin by receiving a bus message associated with speculative execution (block 310). As an example, such a bus message may be received from a cache controller that is associated with a thread undergoing speculative execution. Based on the received bus message, it may be determined whether data corresponding to the bus message exists in the cache receiving the bus message (diamond 320). For example, based on tag information sent with the bus message it may be determined whether there is a hit in the cache. If not, method 300 may conclude.

If instead a hit occurs, control passes to block 330. There it may be determined whether a conflict exists between data of the speculative access and data in the local cache. In various embodiments, the cache controller may determine whether a conflict exists, e.g., by comparing a speculative word mask received with the message to the appropriate speculative word mask of the hit cache line. As an example, a bitwise logical AND operation may be performed between the received mask and the appropriate mask of the hit data line. This operation will be discussed further below with more detail. If a match occurs (i.e., a logic "one" results from the logical AND operation), this indicates a conflict. Accordingly, control passes to block 340. If instead, no hits occurs (i.e., all logic "zeros" result from a logical AND operation), no conflict exists and method 300 may conclude.

Still referring to FIG. 5, if a conflict does exist, the cache controller may signal a data dependency violation (block 340). More specifically, an inter-thread data dependency violation may be signaled. In one embodiment, the cache controller determining the violation may send a so-called violation (Viol) message, e.g., to its associated core along with the thread identifiers of the conflicting threads. In turn, the core may vector to an application handler that performs an ordering comparison between the conflicting threads. Based on the determination of ordering dependency, the application handler may generate bus messages to indicate which one or more threads should be squashed to prevent data violations. Although shown with this particular implementation in the embodiment of FIG. 5, it is to be understood that other manners of handling incoming bus messages may be realized.

Figure 6:
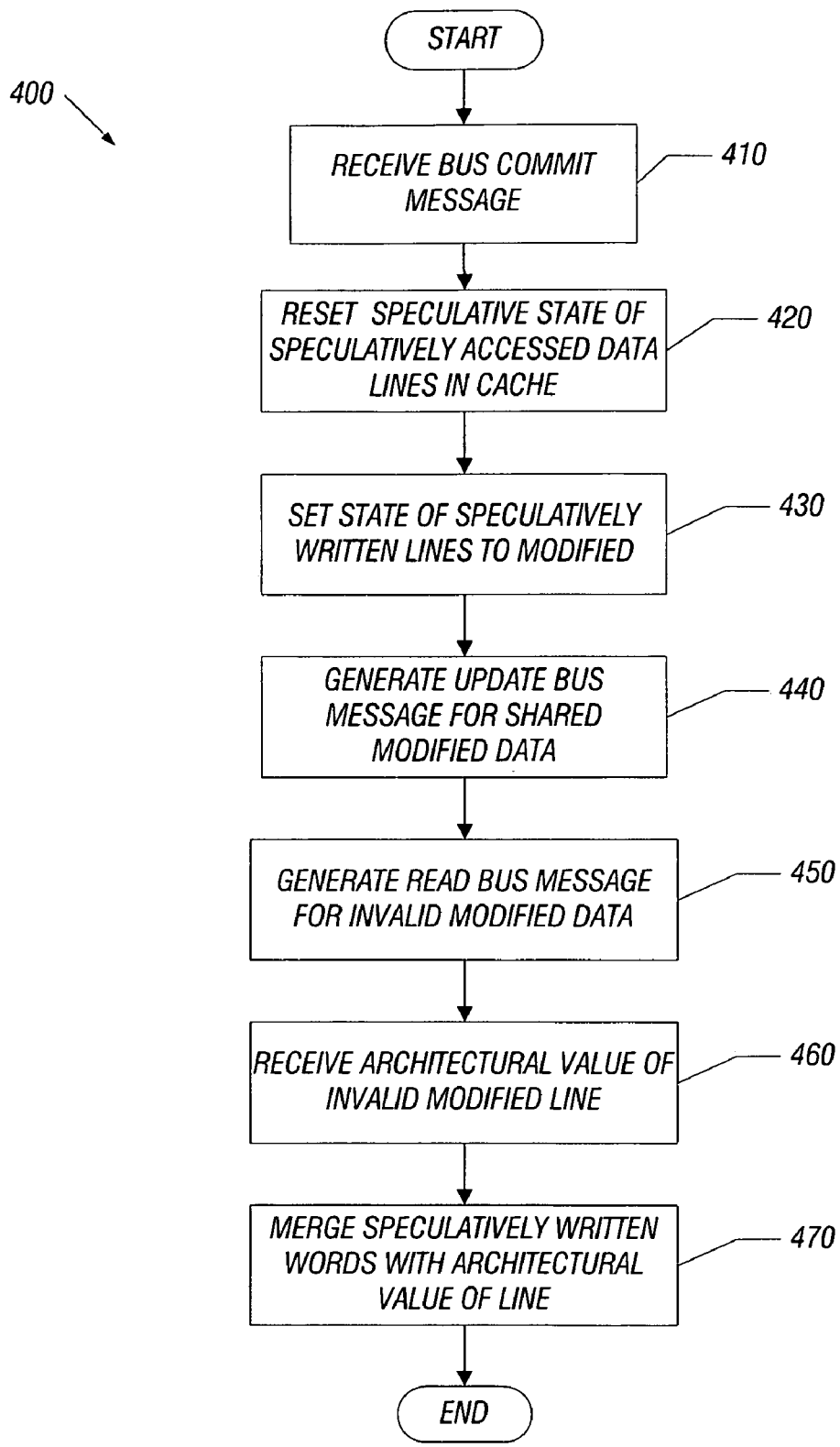
FIG. 6 is a flow diagram of a method for committing results of a speculative operation in accordance with one embodiment of the present invention.

Referring now to FIG. 6, shown is a flow diagram of a method for committing results of a speculative operation to an architectural state in accordance with one embodiment of the present invention. As shown in FIG. 6, method 400 may begin by receiving a bus commit message (block 410). Such a commit bus message may be received by a cache controller that receives an indication that the data stored in its cache that was speculatively generated has been validated.

Accordingly, the cache controller may reset the speculative state of speculatively accessed data lines in its local cache (block 420). That is, both of first and second speculative word masks for any cache lines accessed speculatively may be reset. Furthermore, any of these cache lines in which one or more words were modified during speculative execution may have its cache coherence state further updated. More specifically, any such lines may be set to a modified state (block 430). For example, in implementations using a MESI protocol, the M bit may be set.

Accordingly, such actions may effectively update the corresponding speculatively accessed cache lines in the local cache to reflect their proper architectural state in light of the validation of the speculative execution. Furthermore, to effect architecturally correct state across the system, the cache controller may further generate an update bus message. More specifically, the cache controller may generate such messages for shared data that was modified (block 440). In one embodiment, a bus update message, i.e., a DUpd message may be sent.

In implementations in which word-level modifications to data have occurred, such bus messages may cause one or more other caches to send an architectural value of the invalid modified data line (block 460). Accordingly, upon receipt of such a value, the local cache may merge its speculatively written words with the architectural value of the line to thus eventually commit the architecturally correct state of the line to memory (block 470). While described with this particular implementation in the embodiment of FIG. 6, it is to be understood that the scope of the present invention is not limited in this regard.

Figure 7:
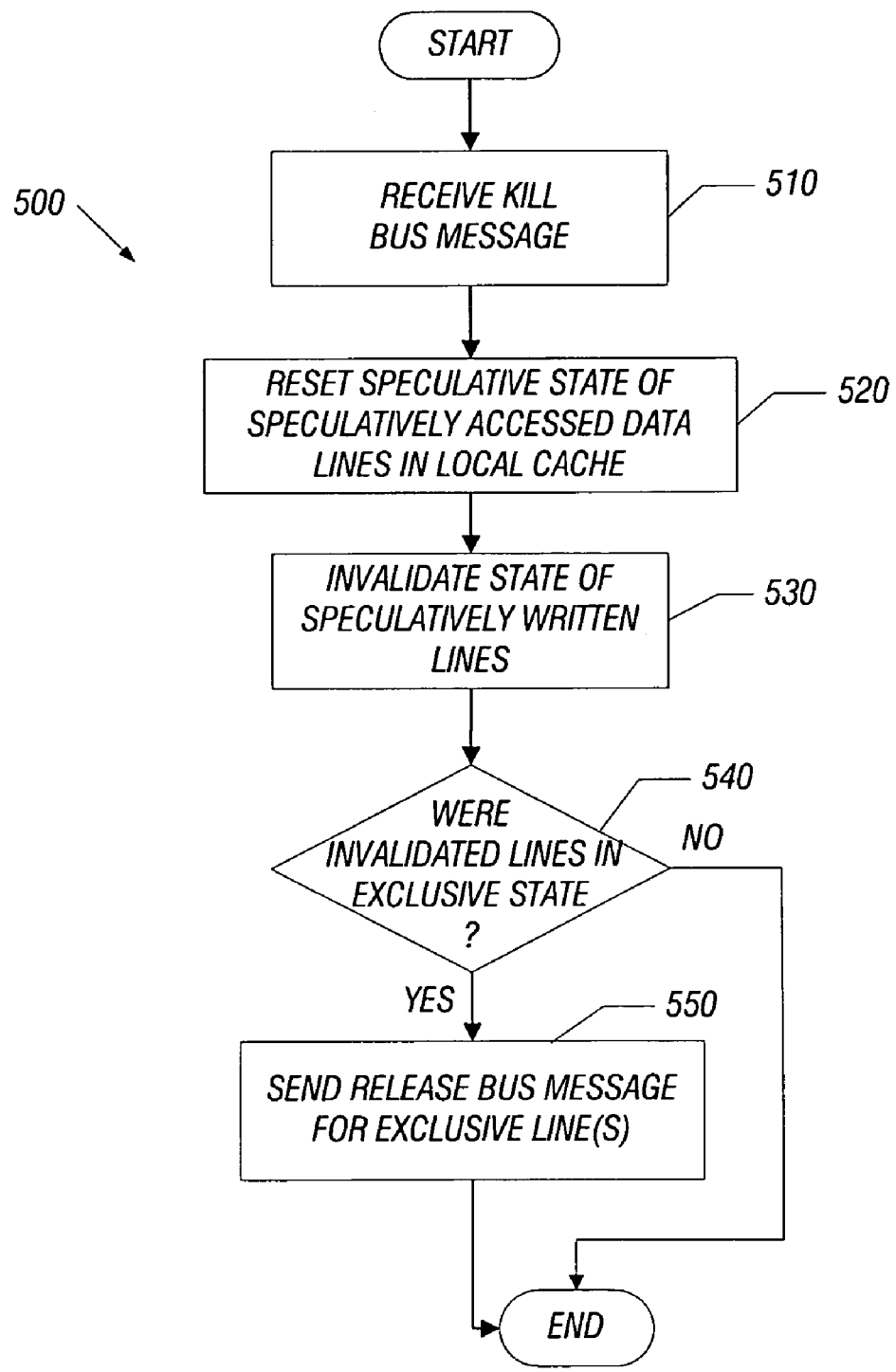
FIG. 7 is a flow diagram of a method for squashing a speculative operation in accordance with an embodiment of the present invention.

An application handler or other agent may determine that speculative execution of a given thread or transaction violates a data dependency rule. When this occurs a so-called kill bus message may be sent. Referring now to FIG. 7, shown is a flow diagram of a method for squashing a speculative operation in accordance with one embodiment of the present invention. Accordingly, as shown in FIG. 7, method 500 may begin when a kill bus message is received (block 510). For example, in one embodiment the message may be received from a core that implements the application handler. However, in other embodiments a cache controller or other system agent may generate the message.

Upon receipt of such a message by a cache controller of a cache that includes the speculatively accessed data, the cache controller may reset the speculative state of such speculatively accessed cache lines (block 520). For example, the first and second speculative word masks may both be cleared for any cache lines that were speculatively accessed.

Next, the cache controller may invalidate the state of any speculatively written cache lines (block 530). Accordingly, any cache lines that had indicators set in the second speculative word masks set may be invalidated. Such invalidation may correspond to a setting of the invalid bit of a MESI state of the associated cache line.

Still referring to FIG. 7, next it may be determined whether any of the invalidated lines were in an exclusive state (diamond 540). That is, it may be determined whether the speculatively accessed invalidated lines were owned exclusively by the local cache. If not, method 500 may conclude. If instead any invalidated lines were in an exclusive state, control passes block 550. There, a release bus message (i.e., RelOwner) may be sent for these previously exclusive cache lines (block 550). Accordingly, the cache controller may send a bus message that releases ownership of the associated cache line(s) and thus returns ownership of the line to memory. While described with this particular implementation in the embodiment of FIG. 7, it is to be understood that the scope of the present invention is not so limited, and in other embodiments other manners of unwinding or squashing invalid speculative execution or transactions may be realized.

Figure 8:
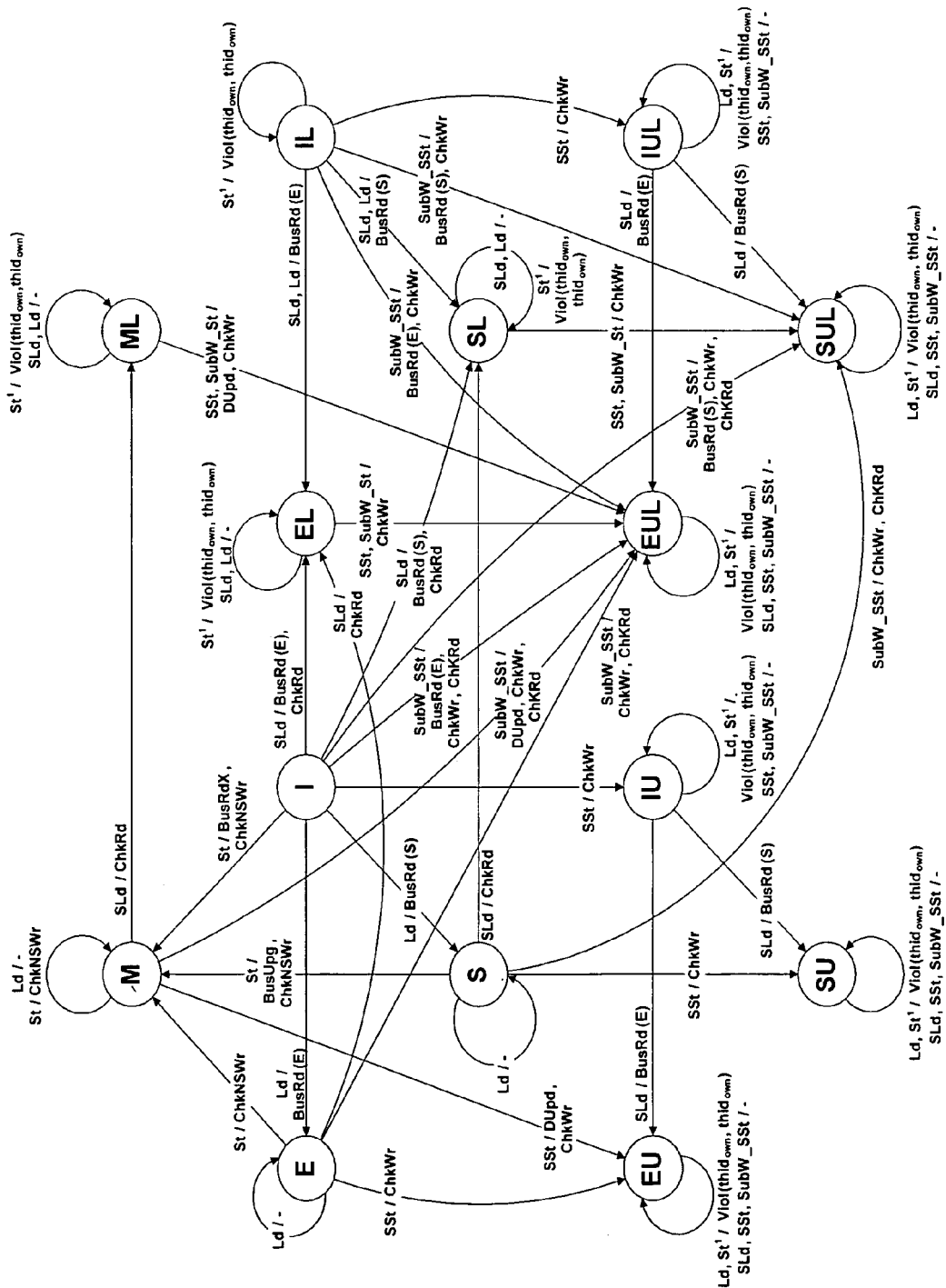
FIG. 8 is a state transition diagram illustrating responses to processor events in accordance with one embodiment of the present invention.
Figure 9:
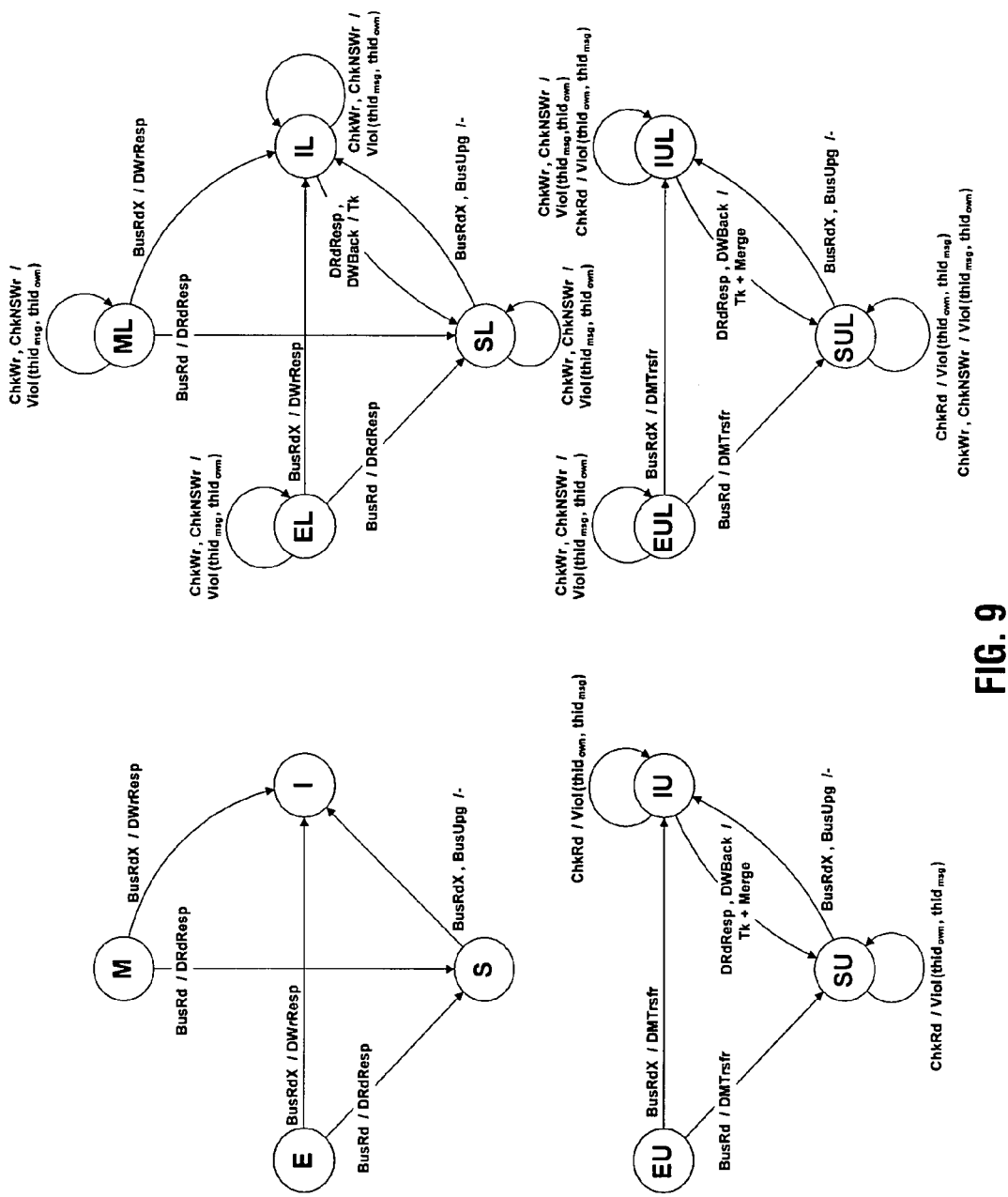
FIG. 9 is a state transition diagram illustrating responses to bus messages in accordance with one embodiment of the present invention.

FIGS. 8 and 9 are state transition diagrams in accordance with an embodiment of the present invention. FIG. 8 shows responses to processor events, while FIG. 9 shows responses to bus messages. Transient states have not been included for the sake of clarity. State transitions are labelled with the following nomenclature: "events or received messages/actions and/or generated messages". The states, events, actions, and messages involved in the protocol as shown in FIGS. 8 and 9 are described in Table 1.

TABLE 1

| State | Description |
|---|---|
| M, E, S, I | MESI states (per line): Modified, Exclusive, Shared, Invalid |
| ML, EL, SL, IL | Speculative loaded states (per word): Word speculatively loaded before produced |
| EU, SU, IU | Speculative stored "Unsafe" states (per word): Word speculatively written |
| EUL, SUL, IUL | Loaded&Unsafe states (per word): Word loaded speculatively and later written |
| Event | |
| Ld | Non-speculative load |
| St | Non-speculative store |
| SLd | Speculative load |
| SSt | Speculative store |
| SubW_SSt | Speculative store to a sub-word |
| Action | |
| Tk | Take the value from the bus and copy it to the line |
| Merge | Merge the new content of the line with the speculative (unsafe) values |
| Viol ($tid_{prod}$, $tid_{cons}$) Message | Call the violation handler due to a dependence violation between $tid_{prod}$ and $tid_{cons}$ |
| BusRd (@$_{line}$) | Bus Read - Requests the value of the line |
| BusRdX (@$_{line}$) | Bus Read eXclusive - Requests the value of the line exclusively (invalidate other copies) |
| BusUpg (@$_{line}$) | Bus Upgrade - Invalidates other copies of the line |
| DRdResp (@$_{line}$) | Data Read Response - Value of the read line |
| DWrResp (@$_{line}$) | Data Write Response - Value of the written line |
| DWBack (@$_{line}$) | Data Write Back - Value of the evicted line |
| RelOwner (@$_{line}$) | Release Ownership - Returns ownership of the line to memory |
| ChkRd (@$_{line}$, word_mask) | Check Read - Checks that no store has written to a word in the word_mask |
| ChkWr (@$_{line}$, word_mask) | Check Write - Checks that no load has read from a word in the word_mask |
| ChkNSWr (@$_{line}$, word_mask) | Check Non-Speculative Write - ChkWr produced by a non-speculative store |
| DUpd (@$_{line}$) | Data Update - Update memory with the value of the line without releasing ownership |
| DMTrsfr (@$_{line}$) | Data Memory Transfer - Memory acquires the ownership of the line and sends its clean copy to the bus |
| BusKill (tid) | Squash - Squash the speculative (unsafe) values of the thread tid cache |
| BusCommit (tid) | Commit - Commit the speculative (unsafe) values of the thread tid cache |

As several examples of the transitions shown in FIGS. 8 and 9, a ChkRd message is generated by any speculative load that accesses a word location that has not been previously accessed (read or written) by the same thread. On the other hand, the ChkWr message is generated by any speculative store to a word location that has not been previously written speculatively (i.e., is not unsafe). As described above, check messages may be only generated on the first speculative load or store to a cache word location. The ChkNSWr message may be generated by any non-speculative store (i.e., a store produced by a non-speculative thread or a "safe" store produced by any thread).

The actual dependence checking may be performed whenever a cache controller receives a check message and compares (e.g. via a bitwise AND operation) the word mask of the message with the L or U bits of the accessed cache line accordingly. In general, the ChkRd message causes the cache controller compare the message word mask against the U bits, whereas the ChkWr and ChkNSWr messages compare it against the L bits. In case there is a conflict, i.e., the bitwise AND is not zero, an inter-thread data dependence is detected and a violation may be raised. This violation invokes an application handler with the thread IDs of the producer and the consumer threads as parameters. When the violation is generated due to a ChkNSWr message, a special thread ID may be passed as the producer parameter to notify that the producer thread is non-speculative.

In various implementations, the application, through the violation handler, may be responsible for managing the squashing of the speculation activity appropriately. In a speculative multithreading execution model, this involves checking the order between producer and consumer threads to verify that the violation is caused by a read-after-write dependence. If so, the handler may send a message to squash the consumer thread and all its successors. In a transactional memory system, since there is no order among threads, only the consumer thread is squashed. Note that the protocol may support multiple versions of the same word location (one version per thread), and thus write-after-write inter-thread data dependencies do not cause any violation.

Sub-word accesses may be specially handled. A speculative store to a sub-word location implies a violation when another thread writes to the same word because cache coherence would not be guaranteed otherwise. In order to do that, a sub-word speculative store may cause an associated cache controller to set the U bit and send a ChkWr message, as done in a speculative store operation. Furthermore, the cache controller may set the L bit and send a ChkRd message. This ensures that whenever another thread performs a store to the same word location, an inter-thread data dependence violation will be detected.

When the speculative activity is validated and no failure is detected, the speculative memory state can be committed to the architectural state. To effect a commit process, a bus message called BusCommit that includes the thread ID of the speculative thread or the transactional region to be committed is sent. When the BusCommit message is received by the cache controller corresponding to the message's thread ID, the speculative memory commit process is initiated. This process may be performed in accordance with the flow diagram set forth in FIG. 6. Additionally, as shown in Table 2 below, the actions performed for cache lines in any of the given states is summarized (i.e., the BusCommit column).

TABLE 2

| | BusCommit | | BusKill | |
|---|---|---|---|---|
| State | Message | New State | Message | New State |
| IL | — | I | — | I |
| SL | — | S | — | S |
| EL | — | E | — | E |
| ML | — | M | — | M |
| IU | BusRdX | M | — | I |
| SU | BusUpg | M | — | I |
| EU | — | M | RelOwner | I |
| IUL | BusRdX | M | — | I |
| SUL | BusUpg | M | — | I |
| EUL | — | M | RelOwner | I |

Note that the commit process resets all the L and U bits on the local data cache lines and puts in M state those lines that have any speculatively written (i.e., unsafe) word. In order to do that, a scan of the local data cache is performed. Those lines in the SU or SUL state cause generation of a bus upgrade (BusUpg) message to invalidate other copies of the cache line. In a similar way, those lines in the IU or IUL state cause generation of a bus read exclusive (BusRdX) message to request the architectural value of the line and locally perform a merge with the words speculatively written. On the other hand, lines in the EU or EUL states shift to the M state without generating any bus message, since the line is only present in that cache.

In case of a speculation failure, the speculative activity has to be squashed. A protocol in accordance with one embodiment of the present invention may be responsible for discarding all the speculative memory state produced by the squashed thread or transactional region. This is implemented through a bus message, called BusKill in one embodiment that includes the thread ID of the speculative thread to be squashed. When the BusKill message is received by the cache controller with thread ID equal to the message thread ID, the speculative memory squash process is initiated. This process may be performed in accordance with the flow diagram set forth in FIG. 7. Additionally, shown in Table 2 are the actions performed for a cache line in each of the given states (i.e., the BusKill column).

As described above, this squash process includes resetting all the L and U bits on the local data cache. Furthermore, those cache lines that have any speculative (i.e., unsafe) word are invalidated. Non-speculatively accessed lines are not changed. Thus, those lines in any one of EU, EUL, SU, SUL, IU, or IUL states shift to I state, and those lines in any one of ML, EL, SL, or IL shift to M, E, S, and I states respectively. Note that lines in EU or EUL state release ownership of the line to memory, through a release owner (i.e., RelOwner) bus message, when they shift to the invalid state.

Accordingly, in various embodiments, thread ordering is handled by software (e.g., compiler-generated code) that is responsible for filtering out inter-thread memory dependencies such as write-after-read operations. A protocol in accordance with one embodiment of the present invention may also support transactional memory execution, where thread order is irrelevant.

Figure 10:
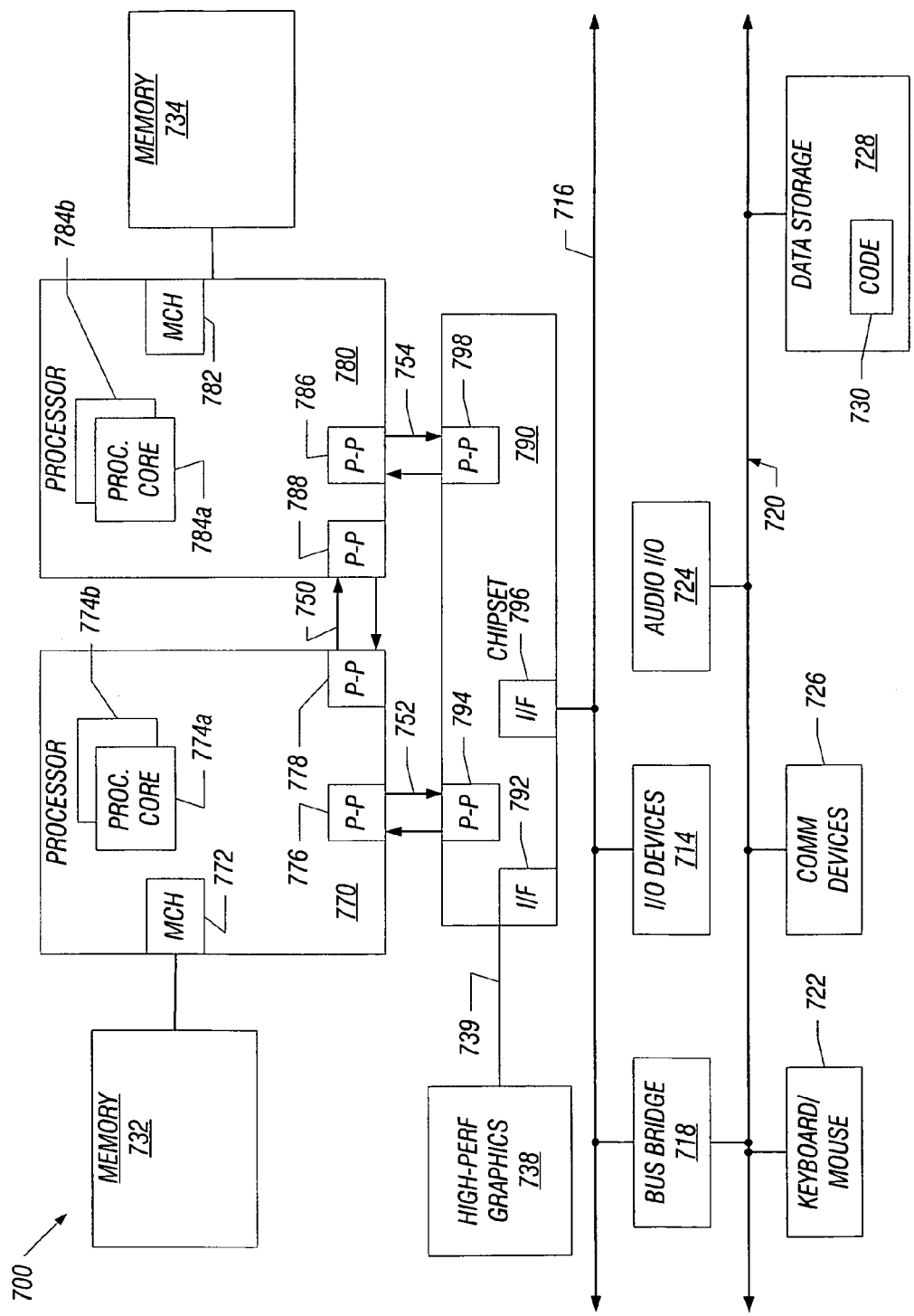
FIG. 10 is a block diagram of a multiprocessor system in accordance with one embodiment of the present invention.

Embodiments may be implemented in many different system types. Referring now to FIG. 10, shown is a block diagram of a system in accordance with an embodiment of the present invention. As shown in FIG. 10, a point-to-point interconnect system 700 includes a first processor 770 and a second processor 780 coupled via a point-to-point interconnect 750. While shown in FIG. 10 as a point-to-point interconnect system, it is understood that the scope of the present pension is not limited in this regard and in other embodiments system 700 may be of a multi-drop bus architecture or another such type of system. As shown in FIG. 10, each of processors 770 and 780 may be multicore processors, including first and second processor cores (i.e., processor cores 774a and 774b and processor cores 784a and 784b). The various processor cores may each include local cache memory implementing a cache coherency protocol in accordance with an embodiment of the present invention. Accordingly, speculative multi-threading and transactions may be performed using system 700.

First processor 770 further includes a memory controller hub (MCH) 772 and point-to-point (P-P) interfaces 776 and 778. Similarly, second processor 780 includes a MCH 782 and P-P interfaces 786 and 788. As shown in FIG. 10, MCH's 772 and 782 couple the processors to respective memories, namely a memory 732 and a memory 734, which may be portions of main memory locally attached to the respective processors.

First processor 770 and second processor 780 may be coupled to a chipset 790 via P-P interfaces 752 and 754, respectively. As shown in FIG. 10, chipset 790 includes P-P interfaces 794 and 798. Furthermore, chipset 790 includes an interface 792 to couple chipset 790 with a high performance graphics engine 738. In one embodiment, an Advanced Graphics Port (AGP) bus 739 may be used to couple graphics engine 738 to chipset 790. AGP bus 739 may conform to the *Accelerated Graphics Port Interface Specification, Revision* 2.0, published May 7, 1998, by Intel Corporation, Santa Clara, Calif. Alternately, a point-to-point interconnect 739 may couple these components.

In turn, chipset 790 may be coupled to a first bus 716 via an interface 796. In one embodiment, first bus 716 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 10, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard/mouse 722, communication devices 726 and a data storage unit 728 which may include code 730, in one embodiment. Further, an audio I/O 724 may be coupled to second bus 720.

Embodiments may be implemented in code and may be stored on a machine accessible medium such as a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a bus message in a first cache, the bus message corresponding to a speculative access to a portion of a second cache by a second thread and without communication of a speculative value of the second cache portion; and
   dynamically determining in the first cache if an inter-thread dependency exists between the second thread and a first thread associated with the first cache with respect to the portion, including comparing a first mask of the bus message to a first mask of a cache line of the first cache including the portion, the first mask indicative of one or more speculative accesses to the portion, and determining the inter-thread dependency based on the comparison.

2. The method of claim 1, further comprising signaling a dependency violation to an application handler associated with an application including the first thread and the second thread if the inter-thread dependency exists.

3. The method of claim 2, further comprising:
   receiving in the application handler the dependency violation signaling and an identifier for the first thread and the second thread; and determining which of the first thread and the second thread to squash based on ordering information of the first thread and the second thread.

4. The method of claim 1, further comprising:
setting a first speculative state indicator for the portion speculatively accessed by the second thread; and
setting a second speculative state indicator for the portion speculatively accessed by the second thread if the portion is speculatively written by the second thread.

5. An apparatus comprising:
a cache memory including a memory array and a cache controller, wherein the memory array is to include a plurality of lines each having:
 a state portion to store a first mask having first speculative indicators each to indicate a speculative access to a corresponding word of the line, the state portion to further store a second mask having second speculative indicators each to indicate a speculative write to a corresponding word of the line; and
 a data portion to store a plurality of words, the data portion to store data corresponding to a speculative access and data corresponding to a non-speculative access; and
the cache controller to transmit and process bus messages associated with speculative cache accesses, wherein the cache controller is to assert an inter-thread dependency violation to an application handler if either of an incoming first or second mask sent with an incoming bus message conflicts with a matching first or second mask in the memory array.

6. The apparatus of claim 5, wherein the state portion is to further store a first set of indicators corresponding to a modified, exclusive, shared, and invalid coherence protocol.

7. The apparatus of claim 6, wherein the first set of indicators are to be maintained on a line basis and the first and second masks are to be maintained on a word basis.

8. The apparatus of claim 5, wherein the cache controller is to receive a bus message to indicate commitment of a speculative thread if the speculative thread is validated.

9. The apparatus of claim 8, wherein the cache controller is to clear the first mask and the second mask of lines associated with the speculative thread if the speculative thread is validated.

10. The apparatus of claim 5, wherein the cache controller is to transmit a first bus message to indicate a speculative access to a word of a line, and to transmit a second bus message to indicate a speculative write to the word, wherein the first and second bus messages are to be transmitted without the word, the first bus message including the first mask and the second bus message including the second mask.

11. A system comprising:
a first processor having a first core and a first cache;
a second processor having a second core and a second cache, wherein a dynamic determination of an inter-cache data dependency of a data value present in both the first cache and the second cache is based on a bus message sent between the first cache and the second cache, the bus message including a message portion, an address portion, a first mask, a thread identifier of a first thread, and not the data value accessed in the first cache by the first thread, the second cache including a second cache controller to dynamically determine the inter-cache data dependency based on comparison of the first mask of the bus message to a first mask of a cache line of the second cache including the data value, the first mask indicative of one or more speculative accesses to the data value; and
a dynamic random access memory (DRAM) coupled to the first processor and the second processor.

12. The system of claim 11, wherein the second cache controller is to generate a violation message to indicate a violation of the inter-cache data dependency based on the bus message.

13. The system of claim 12, further comprising a handler to receive the violation message and to determine ordering between a producer thread and a consumer thread.

14. The system of claim 13, further comprising an application program including the producer thread and the consumer thread, the application program further including the handler.

15. The system of claim 12, wherein the first cache comprises a first cache controller to signal an inter-cache data dependency violation if a non-speculative access to a speculatively accessed location in the first cache occurs, wherein the speculative access comprises a safe operation.

* * * * *